(12) United States Patent
Brizio

(10) Patent No.: US 9,101,241 B2
(45) Date of Patent: Aug. 11, 2015

(54) DEVICE FOR EXTEMPORANEOUSLY PREPARING A HOT BEVERAGE FROM A SOLUBLE POWDER

(75) Inventor: Adriana Brizio, Ruvigliana (CH)

(73) Assignee: ALISTELLA S.A., Lugano (CH)

( * ) Notice: Subject to any disclaimer, the term of this patent is extended or adjusted under 35 U.S.C. 154(b) by 775 days.

(21) Appl. No.: 13/061,788

(22) PCT Filed: Oct. 24, 2008

(86) PCT No.: PCT/EP2008/064456
§ 371 (c)(1),
(2), (4) Date: Mar. 2, 2011

(87) PCT Pub. No.: WO2010/045983
PCT Pub. Date: Apr. 29, 2010

(65) Prior Publication Data
US 2011/0168030 A1    Jul. 14, 2011

(51) Int. Cl.
| | | |
|---|---|---|
| A47J 31/04 | (2006.01) |
| A47J 31/02 | (2006.01) |
| A23F 3/00 | (2006.01) |
| A23F 5/00 | (2006.01) |
| A47J 31/00 | (2006.01) |
| A47J 31/30 | (2006.01) |
| A47J 31/40 | (2006.01) |

(52) U.S. Cl.
CPC ............... *A47J 31/005* (2013.01); *A47J 31/04* (2013.01); *A47J 31/30* (2013.01); *A47J 31/40* (2013.01)

(58) Field of Classification Search
CPC ......... A47J 31/005; A47J 31/04; A47J 31/06; A47J 31/08; A47J 31/30; A47J 31/40; A47J 31/0573; A47J 31/0576
USPC ............... 99/279, 292, 323.3, 310–315, 316; 426/106
See application file for complete search history.

(56) References Cited

U.S. PATENT DOCUMENTS

| | | | |
|---|---|---|---|
| 2,073,265 A | * | 3/1937 | Oman ............................. 99/283 |
| 2,298,854 A | * | 10/1942 | Wolcott ....................... 210/481 |
| 2006/0165851 A1 | | 7/2006 | Brizio |

FOREIGN PATENT DOCUMENTS

WO     2004 073468     9/2004

OTHER PUBLICATIONS

International Search Report issued Aug. 4, 2009 in PCT/EP08/064456 filed Oct. 24, 2008.

\* cited by examiner

*Primary Examiner* — Dana Ross
*Assistant Examiner* — Lindsey C Teaters
(74) *Attorney, Agent, or Firm* — Oblon, McClelland, Maier & Neustadt, L.L.P.

(57) ABSTRACT

The device for extemporaneously preparing a hot beverage anywhere and anytime from a soluble powder comprises a container which is divided into an upper hollow space and a lower hollow space by a baffle. The lower hollow space contains a quantity of drinkable liquid and the upper hollow space a quantity of soluble powder able to produce said beverage. An elongated hollow element is provided, which is open at its two ends and which connects the lower and the upper hollow spaces, sealing membranes are provided for sealing the connection between the upper and the lower hollow spaces through the elongated element. The sealing membranes can be made ineffective by intervention of the user or once a predetermined pressure inside the liquid has been reached.

17 Claims, 4 Drawing Sheets

DEVICE FOR EXTEMPORANEOUSLY PREPARING A HOT BEVERAGE FROM A SOLUBLE POWDER

The present invention relates to a device by which a comfortable hot beverage may be prepared anytime and anywhere from a soluble powder.

Many soluble powders such as, for instance, milk powders, coffee powders or cacao powder, for the extemporaneously preparation of hot drinks by being added to a hot liquid, especially hot water, have been wide-spread on the market for many decades. Said powders are commonly put by the user into a cup-like container; then the user heats a predetermined amount of drinkable liquid—most commonly water—in a separate container, finally the user pours the hot liquid into said cup-like container in order to put said drinkable liquid into contact with the soluble powder contained therein and stirs the mixture thereby obtained in order to produce a homogeneous beverage.

The aforesaid operation entails the necessity of having at disposal a predetermined quantity of soluble powder, a cup-like container in which the soluble powder can be positioned and in which the hot drinkable liquid can be added, a separate container suitable to be placed onto a heating source to heat the drinkable liquid, and a predetermined amount of drinkable liquid, most commonly water. This may not be a problem when the user is at home, but some problems may arise when the user is on travel or excursion, or when he is doing sports, or else when he is in a place where no drinkable water is available. In these latter cases, in fact, the user should bring with himself a soluble powder pack, a cup-like container, a separate container suitable to be placed onto a heating source and finally a predetermined quantity of drinkable liquid, e.g. water.

WO-A-2004/073468 describes a device for extemporaneously preparing a hot beverage anywhere and any time from a substance able to produce the required beverage by extraction and/or infusion (e.g. a ground coffee), comprising a container having a side wall, a base and a removable sealing lid. The container inner space is divided into an upper hollow space and a lower hollow space by a baffle. The lower hollow space contains a quantity of drinkable liquid and the upper allow space contains a filtering means containing said substance. An elongate hollow element is provided, which is open at its two ends and which conveys said drinkable liquid from the lower hollow space to the upper hollow space through the filtering means. Sealing means are provided for preventing the connection between the upper and the lower hollow spaces through elongated element, which sealing means can be made ineffective by intervention of the user or once a predetermined pressure into the liquid or a predetermined temperature have been reached.

Aim of the present invention is to provide a device in which anyone of all the elements listed above, i.e. a cup-like container, a predetermined amount of soluble powder, a separate container suitable to be placed onto a heating source and a predetermined amount of drinkable liquid are converged into one single unit which includes all that is necessary to extemporaneously produce a hot beverage and which is easily handled, transported, stocked and distributed on a large scale.

The aforespecified object is attained by a device according to the present invention, comprising a container having a side wall, a base and a removable sealing lid, the container inner space being divided into an upper hollow space and a lower hollow space by a baffle, the lower hollow space containing a quantity of drinkable liquid and the upper hollow space containing a quantity of soluble powder able to produce said beverage, an elongated hollow element being provided, which is open at its two ends and which conveys said drinkable liquid from the lower hollow space to the upper hollow space, the open upper end of the elongated element having an elevation higher than the level of said beverage in the upper hollow space, sealing means being provided for preventing the connection between the upper and the lower hollow spaces through the elongated element, which sealing means can be made ineffective by intervention of the user or once a predetermined pressure into the liquid or a predetermined temperature have been reached.

Conveniently the elongated hollow element comprises a tube inserted into a sleeve which passes through said baffle and which is fixed thereto, so that the tube conveys the drinkable liquid from the lower to the upper hollow spaces, the conveyer tube being axially movable in the sleeve. When the device is supplied to the user the lower end of the sleeve protrudes downwards more than the lower end of the conveyer tube. Said sealing means may be a thin membrane of a material suitable to come into contact with food products (e.g. aluminium), the membrane sealing the lower end of the sleeve and being tearable following the action of pushing the conveyer tube downwards exerted by the user after the container lid has been opened or removed and before the device is subjected to the action of the heating source.

According to a variant of the invention, the conveyer tube is fixed to said sleeve or also directly to the baffle, the sealing means being still a membrane but of a material which melts due to the heating of the device.

In a further variant of the invention, the tube is still fixed to the sleeve or directly to the baffle and the sealing means are a membrane having a thickness which allows it to be torn once a predetermined liquid pressure due to the heating action of the heating source has been reached.

Said sealing means have to avoid the contact between the soluble powder and the drinkable liquid until the user decides to prepare the hot beverage.

Depending on the quality of the soluble powder, various different hot beverages like coffee, hot chocolate, cappuccino, tea may be prepared. After use, the container with its inner components may be disposed.

It is easy to understand the advantage of having at disposal a device as that disclosed above, especially when it is shaped and sized as a beverage can.

The invention will be more easily understood from the following description of some embodiments thereof, predetermined merely by way of example, taken in conjunction with the accompanying drawings, in which.

It is hereby specified that in the several drawings like numerals designate like or similar elements and that in some instances the dimensions have been maximized for clarity's sake.

Figure 1:
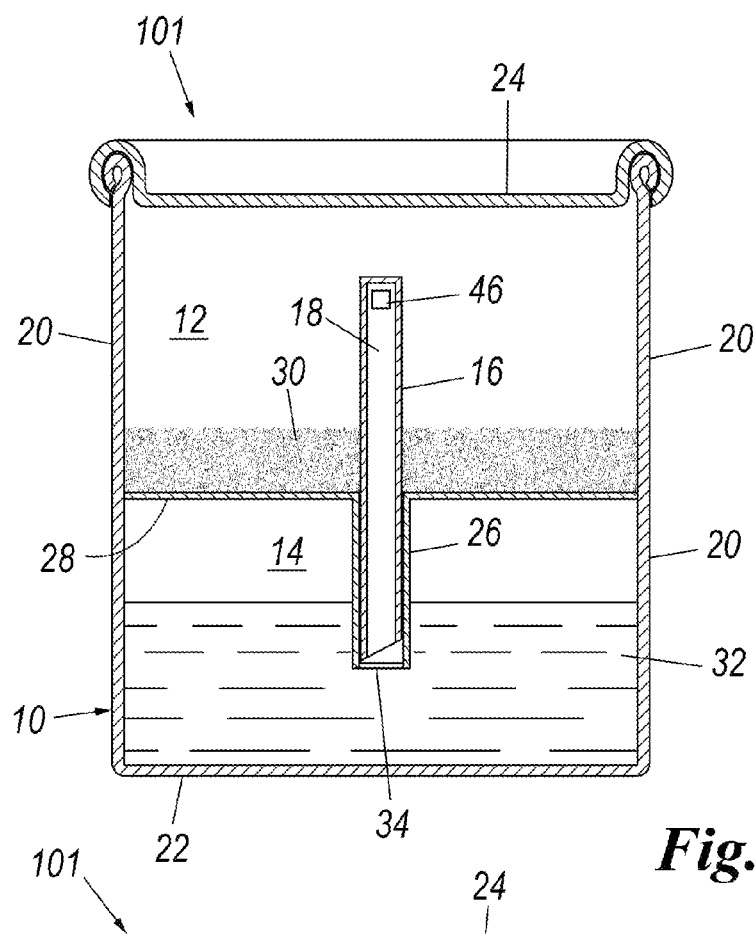
FIG. 1 is an axial cross-section of a first embodiment of the device according to the invention, in the condition in which it is supplied to the user.

As can be seen in FIG. 1, a container 10, making part of a device 101, has a side wall 20, a base 22 and a lid 24. The container 10 includes an upper hollow space 12 containing a pre-dosed quantity of soluble powder 30 and intended to collect the final beverage, a lower hollow-space 14 containing a pre-dosed quantity of drinkable liquid 32, and a conveyer tube 16 inserted into a sleeve 26 which passes through a baffle 28, which it is fixed to, and which protrudes downwards. The conveyer tube 16 and the sleeve 26 form the aforementioned elongated element connecting the lower and the upper hollow spaces 14 and 12, so that the drinkable liquid 32 is forced to move from the lower hollow-space 14 to the upward hollow-space 12 through the tube 16 and its upper apertures 46, when the pressure inside the lower hollow-space 14 increases due to the heating of the drinkable liquid 32. As can be seen from FIG. 1, the upper end of the tube 16 is provided with apertures 46.

A membrane 34, fixed to the lower end of the sleeve 26, sealingly separates the drinkable liquid 32 from the inner space 18 of the tube 16.

Figure 2:
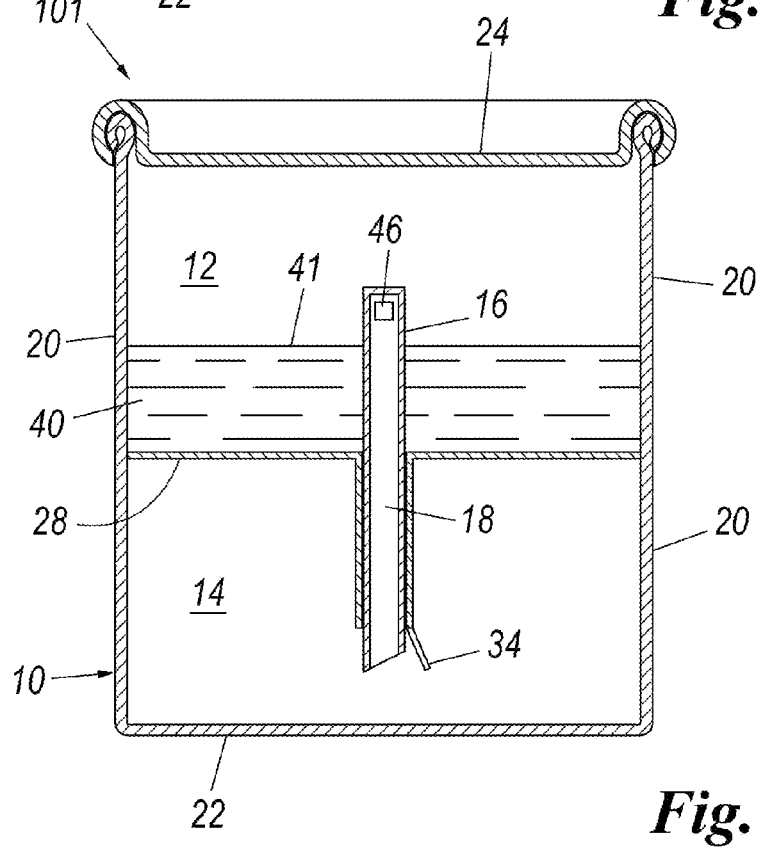
FIG. 2 shows the final situation of the device in which the hot beverage has been produced.

FIG. 2 shows the device 101 in its final situation in which the membrane 34 has been torn by the user by causing the conveyer tube 16 to move downwards and in which the previous drinkable liquid 32 has moved from the lower hollow space 14 to the upper hollow space 12 through the inner space 18 of the tube 16 because of the pressure increase inside the lower hollow-space 14 under the effect of heating, the drinkable liquid 32 having come into contact with the soluble powder 30 thus having produced a hot beverage 40. As it can be seen, the level of the apertures 46 must be higher than that of the beverage 40. Advantageously, the lower end of the tube 16 is shaped as the mouthpiece of a flute (as in FIGS. 1 and 2) so as to ensure a connection between the lower and the upper hollow spaces 14, 16 even if the user pushes the tube 16 downwards until the lower end of the tube 16 touches the base 22 of the container 10. As a variant, the sleeve 26 has an inwardly threaded portion and the tube 16, which, in turn, has an outwardly threaded portion, is screwed into the sleeve. In this case, the downwards movement of the tube 16 is obtained by screwing it into the sleeve 26.

Figure 3:
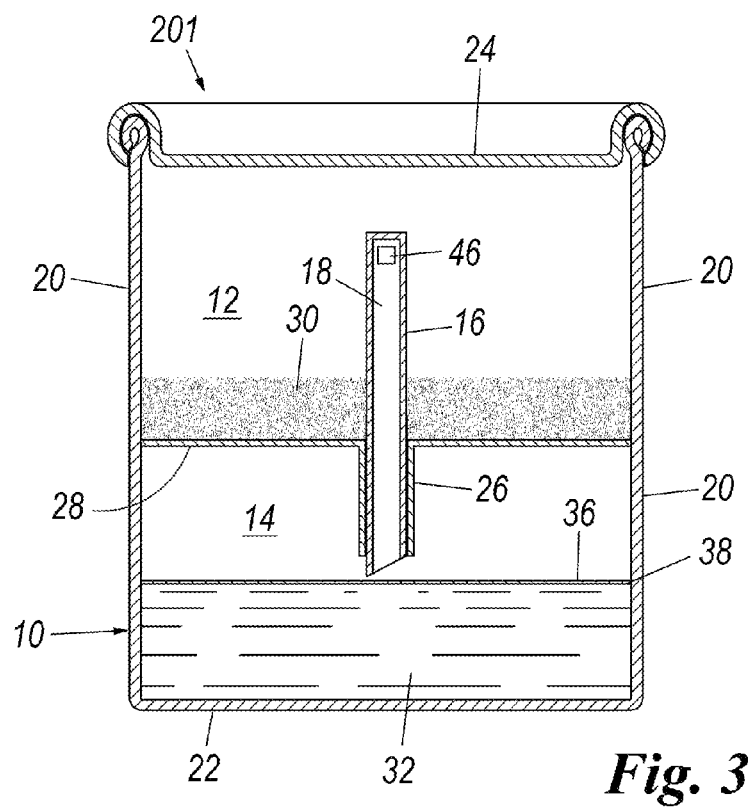
FIGS. 3-8 are an axial cross-section of other possible embodiments of the device according to the invention, in the condition in which it is supplied to the user.

FIG. 3 shows another possible embodiment 201 of the device according to the invention, in which a membrane 36 inside the lower hollow-space 14 is sealed to the wall 20 of the container 10 at its perimeter area 38, the membrane 36 sealing the liquid 32 and being intended to be torn by pushing the tube 16 downwards. In this embodiment the sleeve 26 may be shorter than the sleeves shown in FIG. 1 and FIG. 2 and can even coincide with the baffle thickness or the baffle structure.

Figure 4:
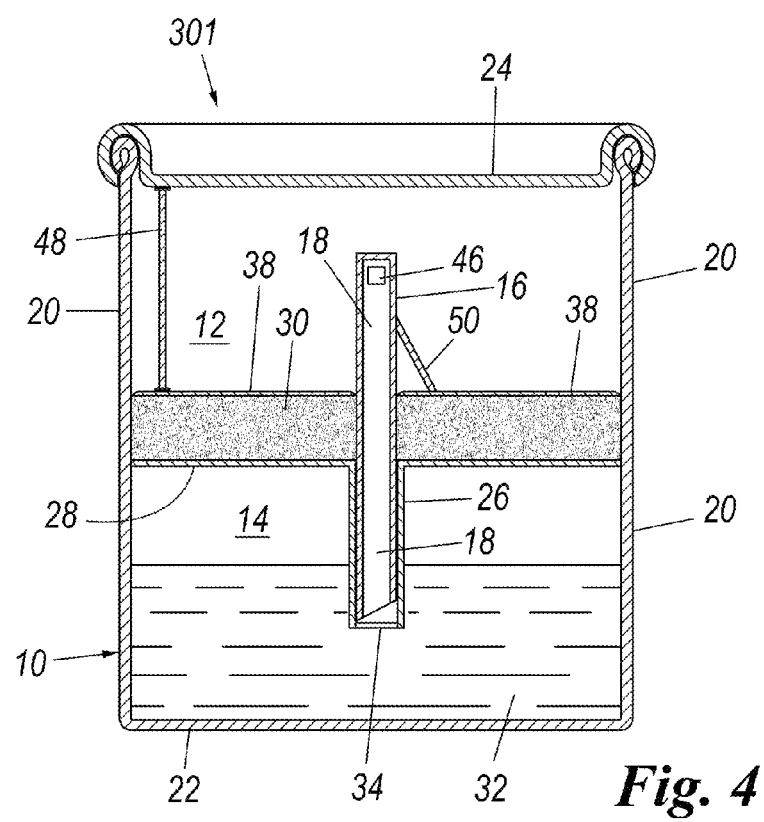

FIG. 4 shows another possible embodiment 301 of the device according to the invention, in which the soluble powder 30 is wrapped in a pack 38 and means 48, 50 for connecting the pack 38 with the sealing lid 24 and/or the connection tube 16 enable the pack 38 to be opened by pulling the lid 24 and/or by operating the tube 16. As already stated, the tube 16 in the embodiments 101, 201 and 301 can be in a fixed position with respect to the sleeve 26. In this case the sealing membrane 34 or 36 can be torn once a predetermined pressure value in the lower hollow space 14 has been reached, so that no further action is required by the user apart from opening or removing the container lid 24 and placing the device in a position in which it is subjected to the action of the heating source. A microwave oven can also be used, provided that the device is made of suitable material (e.g. suitable plastic material).

As also mentioned above, while a tube 16 is still in a fixed position with respect to the sleeve 26, the membrane 34 or 36 can be of a material (obviously of the type suitable to be in contact with food products) which melts under effect of the heating action exerted by the heating source, thereby forming a connection between the lower and upper hollow spaces 14, 16.

Figure 8:
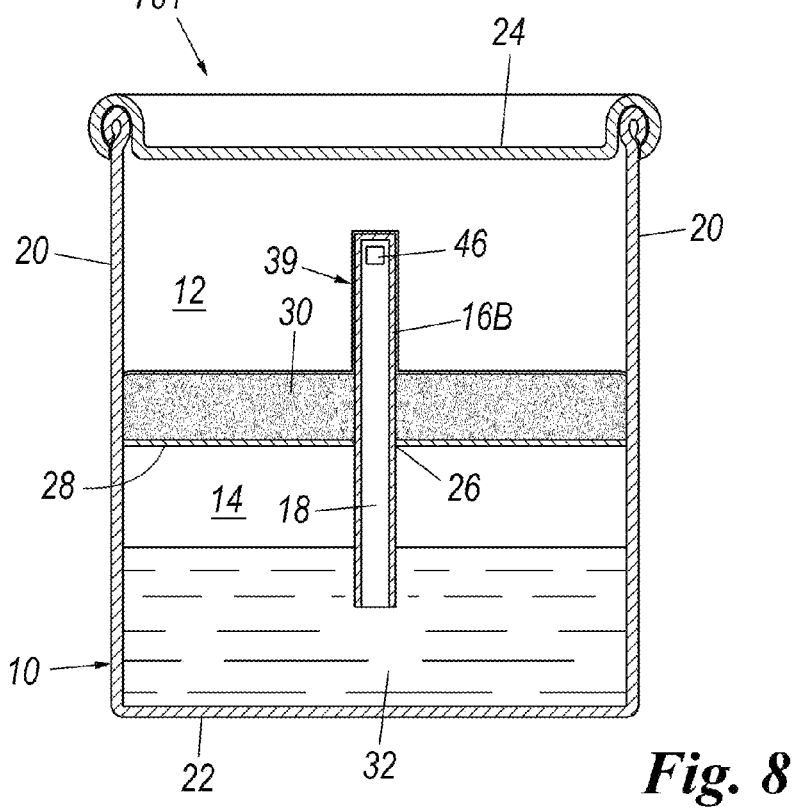

If a fixed conveyer tube is used, the sleeve 26 is not required in that the tube can be fixed directly to the baffle 28 (see the conveyer tube 16B in FIG. 8).

Figure 7:
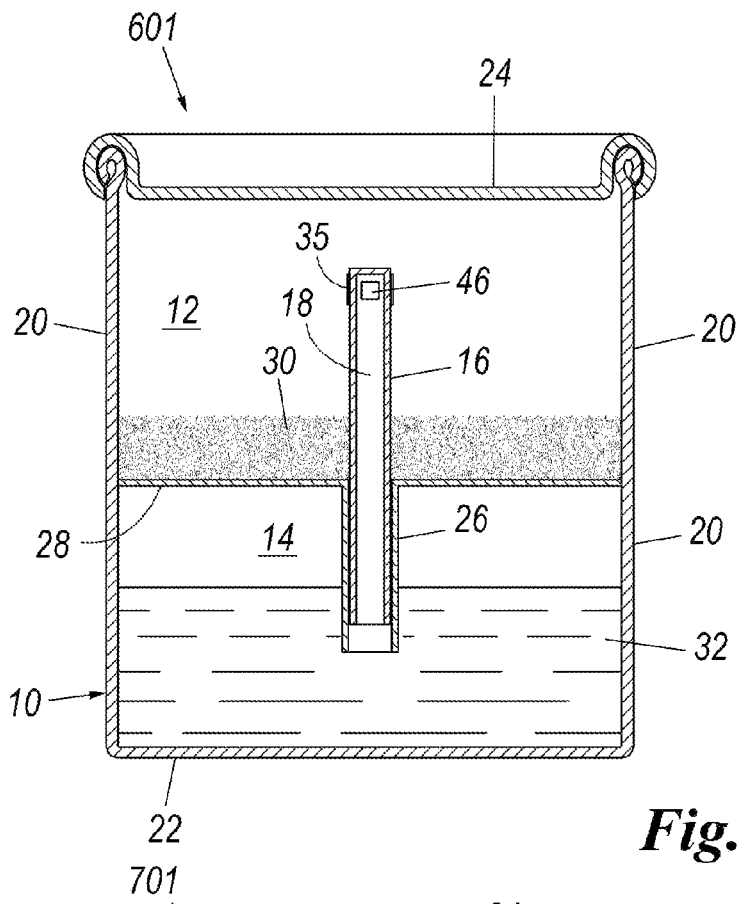

It should also be noted that if a fixed conveyer tube is used and the sealing membrane is of the type which melts following heating or is torn once a predetermined pressure value has been reached, such a membrane can be positioned at the upper end of the conveyer tube, instead of the lower end of the sleeve 26 or the tube 16, so as to seal the apertures 46. A further variant 601 with a fixed conveyer tube is shown in FIG. 7 and provides that the sealing means 35 which seal the apertures 46 at the upper end of the conveyer tube 16 can be torn by the user (e.g. by using an impermeable membrane which seals the apertures 46 and which has a tearing flap, not shown in FIG. 7).

Figure 5:
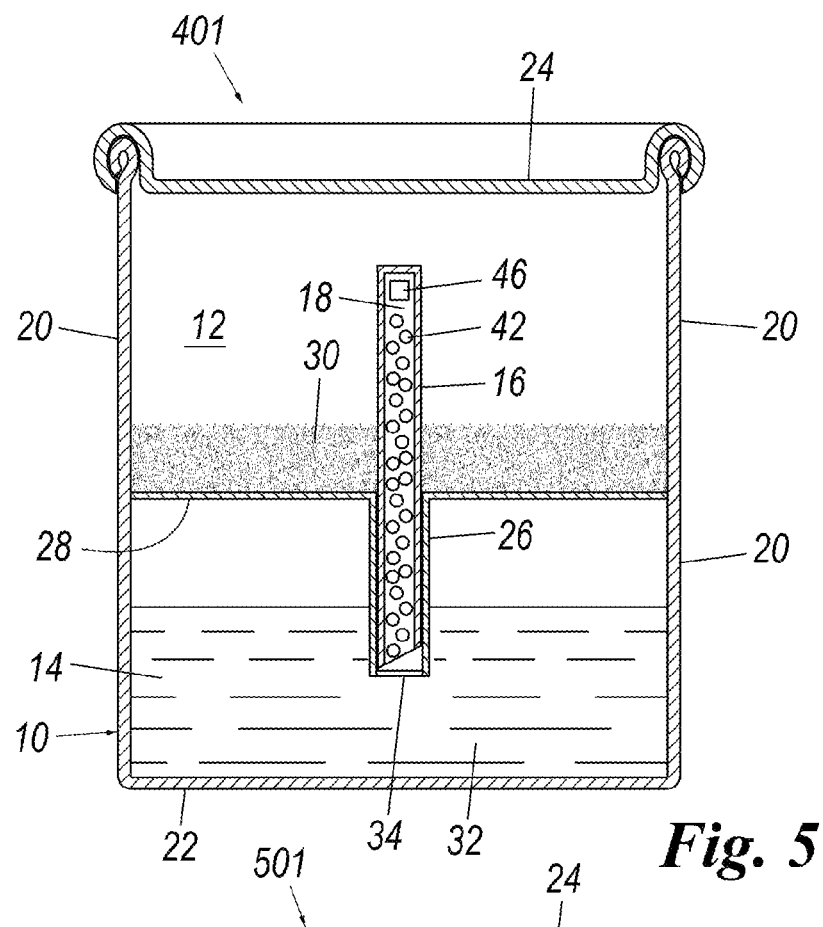

FIG. 5 shows another possible embodiment 401 in which some additional powder 42 different from the soluble powder 30 is contained in the inner space 18 of the tube 26 in order to adjust (e.g. aromatizing) the flavor and/or the composition of the beverage prepared from the soluble powder 30.

Figure 6:
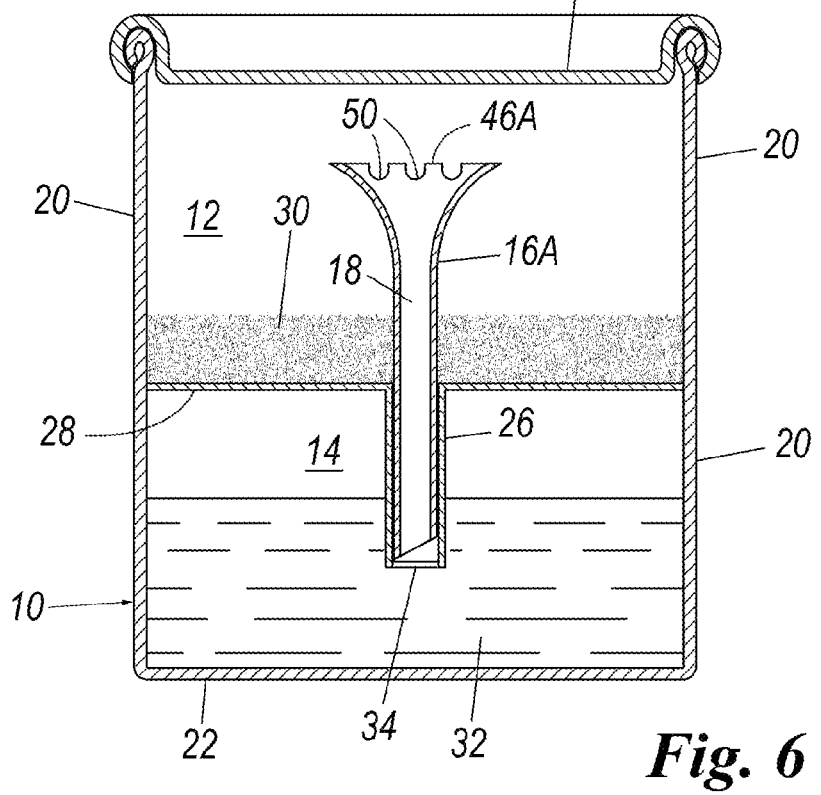

In FIG. 6 a device 501 is shown which has an elongated hollow element 16A with an open upper end 46A which is flared for a better distribution of the hot liquid on the soluble powder 30, it being otherwise identical to the device 101 of FIG. 1

It should be noted that the elongated element 16A can be in a fixed position with respect to the sleeve 26 (or directly fixed to the baffle 28, thereby eliminating the need to have the sleeve 26) if the sealing means which seal the aperture 46A at the upper end of the elongated element 16A are of the type which melts following heating or which are torn once a predetermined pressure has been reached.

In particular, the flared upper end 46A of the elongated element 16A has edge notches 50 which facilitate the distribution of the hot liquid. A further embodiment 701 shown in FIG. 8 (which has already been mentioned above) provides a coating 39 both sealing the apertures 46 in the upper end of the conveyer tube 16B and packaging the soluble powder 30 inside the upper hollow space 12, said coating being removable by the user (for instance by providing it with a tearing flap, not shown) before subjecting the device 701 to the action of a heating source.

The components of the device according to the invention (obviously with exclusion of the liquid and powders) may be all of the same material, such as a suitable metal (e.g. aluminium or a suitable plastic material), but this is not mandatory. For instance, the container 10 and the lid 24 may be of aluminium, whereas the baffle 28, the tube 16 and the sleeve 26 can be made of a suitable plastic material, such as polyethylene, polyethylene terephthalate, or bioplastic materials, e.g. a complete or partial biological degradable plastic comprising, for instance, cellulose or starch.

The invention claimed is:

1. A device for extemporaneously preparing a hot beverage from a soluble powder, comprising:
    a container having a side wall, a base, and a removable sealing lid, the container inner space being divided into an upper hollow space and a lower hollow space by a baffle, the lower hollow space containing a quantity of drinkable liquid, the upper hollow space containing a quantity of soluble powder able to produce said beverage, the soluble powder being placed on the baffle, and the upper hollow space is a final storage space for said beverage produced from the soluble powder to store said beverage in a same partitioned space in which the soluble powder initially occupies,
    an elongated hollow element being provided, which is open at its two ends and which conveys said drinkable liquid from the lower hollow space to the upper hollow space, the open upper end of the elongated element having an elevation higher than the level of said beverage in the upper hollow space, and a seal being provided to prevent the conveying of said drinkable liquid between the upper and the lower hollow spaces through the elongated element and the seal is made ineffective by intervention of a user or once a predetermined pressure into the liquid or a predetermined temperature has been reached.

2. The device according to claim 1, wherein the elongated hollow element comprises a sleeve which is fixed to the baffle and which passes therethrough, and a conveyer tube inserted into the sleeve.

3. The device according to claim 2, wherein the conveyer tube is movable in the sleeve and the seal includes an impermeable membrane which is fixed to the lower end of the sleeve and which is tearable as a consequence of the user moving down the conveyer tube.

4. The device according to claim 2, wherein the conveyer tube is movable into the sleeve and the seal includes an impermeable membrane which covers the liquid and which is fixed to the side wall of the container at the perimetral portion thereof, and which is tearable as a consequence of the user moving down the conveyer tube.

5. The device according to claim 4, wherein a structure is provided which links the powder package to the sealing lid in order to open the powder package when the user pulls the lid.

6. The device according to claim 4, wherein a structure is provided which connects the powder package to the conveyer tube in order to open the powder package when the user operates the conveyer tube.

7. The device according to claim 2, wherein the conveyer tube is in a fixed position with respect to the sleeve and the seal includes an impermeable membrane which is tearable once a predetermined pressure has been reached in the liquid.

8. The device according to claim 2, wherein the conveyer tube is in a fixed position with respect to the sleeve and the seal includes an impermeable membrane which melts when the temperature has reached a predetermined value.

9. The device according to claim 2, wherein the conveyer tube is in a fixed position with respect to the sleeve and the seal includes one or more impermeable membranes sealing the conveyer tube upper apertures and being removable by the user.

10. The device according to claim 1, wherein, when delivered to the user, the pre-dosed quantity of soluble powder positioned in the upward hollow space is contained in a package.

11. The device according to claim 10, wherein a structure is provided which links the powder package to the sealing lid in order to open the powder package when the user pulls the lid.

12. The device according to claim 10, wherein a structure is provided which connects the powder package to the conveyer tube in order to open the powder package when the user operates the conveyer tube.

13. The device according to claim 10, wherein a structure is provided which links the powder package to the sealing lid in order to open the powder package when the user pulls the lid.

14. The device according to claim 10, wherein a structure is provided which connects the powder package to the conveyer tube in order to open the powder package when the user operates the conveyer tube.

15. The device according to claim 1, wherein a coating simultaneously seals the open upper end of the elongated element and packages the soluble powder inside the upper hollow space, said coating being removable by the user.

16. The device according to claim 1 in which an additional powder different from the soluble powder is provided in the inner space of the elongated element when the device is delivered to the user.

17. The device according to claim 1, wherein the container is a filterless container that does not require a filter to produce said beverage from the soluble powder.

* * * * *